(12) United States Patent
Zhang

(10) Patent No.: US 11,364,781 B2
(45) Date of Patent: Jun. 21, 2022

(54) LOCKING DEVICE, FIXED BASE AND ELECTRIC VEHICLE

(71) Applicant: SHANGHAI DIANBA NEW ENERGY TECHNOLOGY CO., LTD., Shanghai (CN)

(72) Inventor: Jianping Zhang, Shanghai (CN)

(73) Assignee: SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 363 days.

(21) Appl. No.: 16/462,828

(22) PCT Filed: Nov. 21, 2017

(86) PCT No.: PCT/CN2017/111994
§ 371 (c)(1),
(2) Date: May 21, 2019

(87) PCT Pub. No.: WO2018/090996
PCT Pub. Date: May 24, 2018

(65) Prior Publication Data
US 2020/0055383 A1 Feb. 20, 2020

(30) Foreign Application Priority Data
Nov. 21, 2016 (CN) .......................... 201611041220.4

(51) Int. Cl.
*B60R 16/04* (2006.01)
*B60K 1/04* (2019.01)
*H01M 50/20* (2021.01)

(52) U.S. Cl.
CPC ............... *B60K 1/04* (2013.01); *H01M 50/20* (2021.01); *B60K 2001/0455* (2013.01); *B60Y 2200/91* (2013.01); *H01M 2220/20* (2013.01)

(58) Field of Classification Search
CPC .... B60K 1/04; B60K 1/00; B60K 2001/0455; B60K 2001/0472; B60K 2001/0405;
(Continued)

(56) References Cited

U.S. PATENT DOCUMENTS 3,799,063 A * 3/1974 Reed ....................... B60L 50/66
104/34
4,087,895 A * 5/1978 Etienne ................... B60L 50/66
29/252
(Continued)

FOREIGN PATENT DOCUMENTS

CN 102673361 9/2012
CN 202764685 3/2013
(Continued)

OTHER PUBLICATIONS

International Search Report for PCT/CN2017/111994, dated Jan. 16, 2018.
(Continued)

*Primary Examiner* — James M Dolak
(74) *Attorney, Agent, or Firm* — B. Aaron Schulman, Esq.; Stites & Harbison, PLLC

(57) ABSTRACT

A locking device includes a lock base. The lock base includes a lock body, a surface of the lock body being provided with a lock groove recessed towards the interior of the lock body, the lock body being internally provided with a lock tongue groove and a lock tongue movably mounted in the lock tongue groove that is in connection with the lock groove; a lock connecting rod movably connected to the lock base through the lock tongue and including a rod member, the rod member driving the lock tongue to move in the lock tongue groove; and a lock shaft including a shaft seat and a shaft rod perpendicularly arranged to a surface of the shaft seat, the shaft rod being inserted into the lock groove of the lock base to perform locking. A fixing seat and
(Continued)

an electric vehicle comprising the locking device are disclosed.

19 Claims, 9 Drawing Sheets

(58) Field of Classification Search
CPC .. H01M 50/20; H01M 50/202; H01M 50/204; H01M 50/244; H01M 50/249; H01M 2220/20; B60Y 2200/91; B60Y 2200/90; B60Y 2200/92
See application file for complete search history.

(56) References Cited

U.S. PATENT DOCUMENTS

| | | | | |
|---|---|---|---|---|
| 4,365,681 A * | 12/1982 | Singh | ................... | H01M 50/20 180/68.5 |
| 7,201,384 B2 * | 4/2007 | Chaney | ................... | B60L 53/80 180/68.5 |
| 8,006,793 B2 * | 8/2011 | Heichal | ................... | B60K 1/04 180/68.5 |
| 8,164,302 B2 * | 4/2012 | Capizzo | ................... | B60L 53/62 320/109 |
| 8,256,553 B2 * | 9/2012 | De Paschoal | ............ | B60G 3/20 180/68.5 |
| 8,511,413 B2 * | 8/2013 | Ojima | ................... | B60L 50/64 180/68.5 |
| 8,516,687 B2 * | 8/2013 | Hozumi | ................... | B60L 53/80 29/729 |
| 8,776,926 B2 * | 7/2014 | Auer | ................... | B60K 1/04 180/68.5 |
| 8,858,152 B1 * | 10/2014 | McDaniel | ............... | B60L 50/64 414/809 |
| 8,925,983 B2 * | 1/2015 | Ohgitani | ................... | B60K 1/04 292/216 |
| 9,070,923 B2 * | 6/2015 | Yu | ................... | B60L 53/80 |
| 9,216,718 B2 * | 12/2015 | Ojima | ................... | B60K 1/04 |
| 9,409,470 B2 * | 8/2016 | Trentin | ................... | B60K 1/04 |
| 9,573,453 B2 * | 2/2017 | Ojima | ................... | B60K 1/04 |
| 9,630,483 B2 * | 4/2017 | Yamada | ................... | B60K 1/04 |
| 9,662,965 B2 * | 5/2017 | Poillot | ................... | H01M 50/20 |
| 9,722,223 B1 * | 8/2017 | Maguire | ............... | H01M 50/20 |
| 9,758,030 B2 * | 9/2017 | Newman | ............. | H01M 50/502 |
| 10,160,344 B2 * | 12/2018 | Newman | ................ | B60L 53/80 |
| 10,183,563 B2 * | 1/2019 | Rayner | ................. | H02J 7/0042 |
| 10,940,747 B2 * | 3/2021 | Bengtsson | ............... | B60K 1/04 |
| 11,177,531 B2 * | 11/2021 | Kinnich | ............... | H01M 50/247 |
| 11,183,731 B2 * | 11/2021 | Zhang | ................. | H01M 50/262 |
| 2011/0223459 A1 * | 9/2011 | Heichal | ................... | B60K 1/04 429/100 |
| 2012/0111654 A1 * | 5/2012 | Origuchi | ................ | B60L 53/80 180/68.5 |

FOREIGN PATENT DOCUMENTS

| | | |
|---|---|---|
| CN | 105109321 | 2/2015 |
| CN | 105150820 | 12/2015 |
| CN | 105437945 | 3/2016 |
| CN | 205429031 | 8/2016 |
| CN | 106427514 | 2/2017 |
| CN | 206186768 | 5/2017 |

OTHER PUBLICATIONS

Written Opinion of the InternationaL Search Authority for PCT/CN2017/111994, dated Feb. 1, 2018.
Search Report for EP application 17871600.7.
First OA for KR application 10-2019-7017972, and full English translation of first OA for KR application 10-2019-7017972.
First OA for SG application 11201904511W.

* cited by examiner

LOCKING DEVICE, FIXED BASE AND ELECTRIC VEHICLE

CROSS-REFERENCE TO RELATED APPLICATION

This application is a US national phase application of International Application No. PCT/CN2017/111994, which claims priority to Chinese Patent Application Serial No. 201611041220.4, filed on Nov. 21, 2016, the entire content of which is incorporated herein by reference.

FIELD

The present disclosure relates to a technical field of electric vehicles, and more particularly to a locking structure for locking a battery of an electric vehicle to the electric vehicle, and a fixing seat and an electric vehicle using such a locking device.

BACKGROUND

A battery of an existing electric vehicle is generally installed in a fixed way or in a replaceable type. The fixed battery is usually fixed to the vehicle, and the vehicle is directly charged during charging. The replaceable battery is usually installed in a movable manner, and the battery can be removed at any time for replacement or for charging and then be installed to the vehicle body after replacement or charging.

At present, a battery may be replaced by a manual operation or an automatic operation. Either way, the battery is mounted to a chassis of the electric vehicle, and the installed battery needs to be locked to the vehicle body. Due to a relatively large weight of the battery, a structure using multiple locking positions to lock simultaneously is employed, but an existing locking structure fails to meet requirements in terms of speed and automation.

SUMMARY

The present disclosure aims to provide a locking device that can automatically unlock a plurality of battery pack locking positions at the same time, and a fixing seat and an electric vehicle using the locking device.

A locking device according to an embodiment includes: a lock base configured to provide a locking position, and including a lock body having a surface provided with a lock groove recessed towards the inside of the lock body, the lock body being provided with a lock tongue groove and a lock tongue movably mounted in the lock tongue groove, and the lock tongue groove in connection with the lock groove; and a lock connecting rod movably connected with the lock base through the lock tongue, and including a rod member configured to drive the lock tongue to move under the action of an external force.

A locking device according to an embodiment includes: a lock base configured to provide a locking position, and including a lock body having a surface provided with a lock groove recessed towards the inside of the lock body, the lock body being provided with a lock tongue groove and a lock tongue movably mounted in the lock tongue groove, and the lock tongue groove being in connection with the lock groove; a lock connecting rod movably connected with the lock base through the lock tongue, and including a rod member configured to drive the lock tongue to move under the action of an external force; and a lock shaft including a shaft seat and a shaft rod, the shaft rod being perpendicularly arranged to a surface of the shaft seat, and the shaft rod being configured to be inserted into the lock groove of the lock base to perform locking.

In an embodiment of the present disclosure, the lock groove extends along the surface of the lock body, and has a first end provided with an opening leading to the outside of the lock body, and a second end away from the opening and provided with an elastic pad and an elastic pad mounting hole; the elastic pad mounting hole is arranged in a side wall of the second end of the lock groove, and the elastic pad is inserted into the elastic pad mounting hole through a pillar protruding from a surface of the elastic pad.

In an embodiment of the present disclosure, the rod member is provided with a through hole configured to be connected with the lock tongue, the shaft seat is provided with a plurality of fixing holes in a surface of the shaft seat, and the shaft seat is mounted to a surface of a component to be locked through the fixing holes.

In an embodiment of the present disclosure, the rod member is provided with an unlocking block on a side facing the lock base, the unlocking block is configured as an arc protrusion formed outwardly by the rod member, and the unlocking block has a top configured as an inner arc groove recessed towards the rod member.

In an embodiment of the present disclosure, a spring pull tab is fixed on a side of the rod member facing the unlocking block, and an exposed end of the spring pull tab is provided with a hooking hole.

In an embodiment of the present disclosure, the lock tongue is connected with the lock base and the lock connecting rod through a shaft, separately, the lock tongue is provided with a stop block on a side adjacent to the lock groove, the stop block is configured to close the opening, and the lock connecting rod drives the lock tongue to close or open the opening under the action of the external force.

In an embodiment of the present disclosure, the shaft rod has a first end movably connected with the shaft seat, and a second end away from the shaft seat and provided with a concave positioning hole, and a positioning component is mounted in the positioning hole.

In an embodiment of the present disclosure, the positioning component is configured as a positioning steel magnet.

In an embodiment of the present disclosure, a sleeve is fitted over an outer surface of the shaft rod, the shaft rod has two ends provided with a retaining ring separately, and the retaining ring is configured to limit a position of the sleeve.

In an embodiment of the present disclosure, the lock body is provided with a lock shaft sensing hole in connection with the lock groove.

In an embodiment of the present disclosure, the rod member is provided with a positioning steel magnet, and the positioning steel magnet is configured to indicate a current position of the rod member.

A fixing seat for a battery of an electric vehicle according to an embodiment of the present disclosure is adapted to be mounted to a vehicle body of the electric vehicle to fix the battery. The fixing seat includes an electrical connector and the above-mentioned locking device. The electrical connector and the locking device are arranged on a side of the fixing seat opposite to the battery, the electrical connector is used for electrical connection between the battery and the vehicle body, and the locking device is used to lock the battery to the vehicle body.

In an embodiment of the present disclosure, the fixing seat further includes a sensing device and a signal transmission unit, the sensing device being configured to detect a position of the battery relative to the locking device, and the signal transmission unit communicating with the sensing device and being configured to communicate with an external battery moving device.

In an embodiment of the present disclosure, the fixing seat further includes a plurality of support devices, the support devices being arranged on a side of the fixing seat facing the battery and configured to support the battery.

In an embodiment of the present disclosure, each of the support devices is provided with a support groove, and a lower surface of the support groove is substantially in the same plane as a lower surface of the lock groove.

An electric vehicle according to an embodiment of the present disclosure includes a power battery and a fixing seat configured to install the power battery, and the fixing seat is mounted to a vehicle body. The electric vehicle further includes a locking device according to any one of the above embodiments, a lock shaft of the locking device is mounted to an outer lateral surface of the power battery through a fixing hole of a shaft seat, a lock base and a lock connecting rod of the locking device are mounted to an inner lateral surface of the fixing seat opposite to the power battery, a lock groove in a surface of the lock base is arranged corresponding to the lock shaft on the outer lateral surface of the power battery, and the lock connecting rod is located above the lock base.

In an embodiment of the present disclosure, the inner lateral surface of the fixing seat is located below the lock connecting rod and is further provided with an elastic component, and the elastic component has a first end fixedly connected with the fixing seat and a second end connected to a hooking hole in a side of the lock connecting rod.

The present disclosure can fix the battery to the electric vehicle in such a way that a plurality of lock shafts distributed on a side edge of the battery are simultaneously inserted into a plurality of lock bases of the electric vehicle, and can simultaneously lock the plurality of lock shafts to the lock bases in an automatic manner by means of the action of the lock connecting rod, thereby improving the efficiency of assembling or disassembling the battery greatly.

By adopting the above-mentioned lock groove structure, the lock base of the present disclosure can provide the battery with a balanced suspension platform, and the elastic pad arranged at the end of the lock groove can reduce the collision between the battery and the fixing seat during the installation and during driving, thereby improving the service life of various locking components.

The lock shaft of the present disclosure can reduce the friction with the lock base, improve the locking and unlocking process, and offer clear motion state information to provide a basis for automatic unlocking and automatic locking.

The present disclosure utilizes a single lock connecting rod to simultaneously control the lock tongues of the plurality of lock bases, realizes a function of synchronously unlocking and locking the plurality of lock bases, so as to improve the unlocking process of the battery and accelerate the battery replacement efficiency.

DETAILED DESCRIPTION

Figure 1:
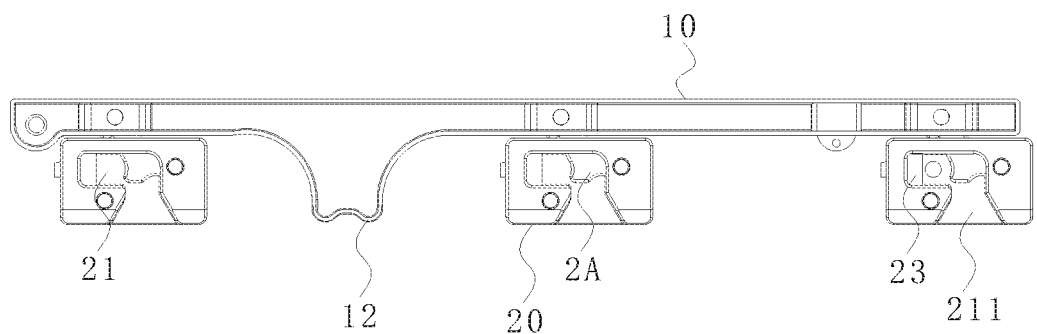
FIG. 1 illustrates a schematic view of a locking device according to an embodiment of the present disclosure.

As shown in FIGS. 1-4, a locking device of an embodiment of the present disclosure generally includes a lock base 20 configured to provide a locking position, a lock shaft 30 configured to be inserted into the lock base 20, and a lock connecting rod 10 configured to unlock the lock shaft 30 after being inserted.

The lock base 20 includes a lock body 25 having a rectangular shape. A front surface of the lock body 25 is provided with a lock groove 21 recessed towards the inside of the lock body 25. The lock base 20 further includes a lock tongue groove 22 and a lock tongue 24 mounted in the lock tongue groove 22. The lock tongue groove 22 is in connection with the lock groove 21, and the lock tongue 24 is movably mounted in the lock tongue groove 22.

The lock shaft 30 includes a shaft seat 34 having a fixing hole, and a shaft rod 31 perpendicularly arranged to a surface of the shaft seat 34 and configured to be inserted into the lock groove 21 of the lock base 20 so as to perform locking.

The lock connecting rod 10 may include an elongated rod member 11 movably connected to the lock tongue 24 of the lock base 20.

Figure 2:
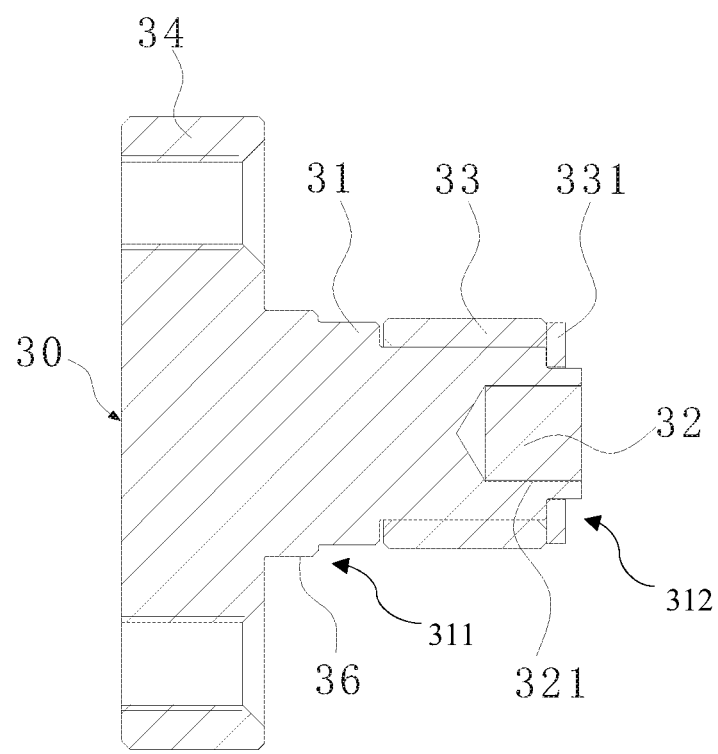
FIG. 2 illustrates a sectional view of a lock shaft along an axis according to an embodiment of the present disclosure.
Figure 3:
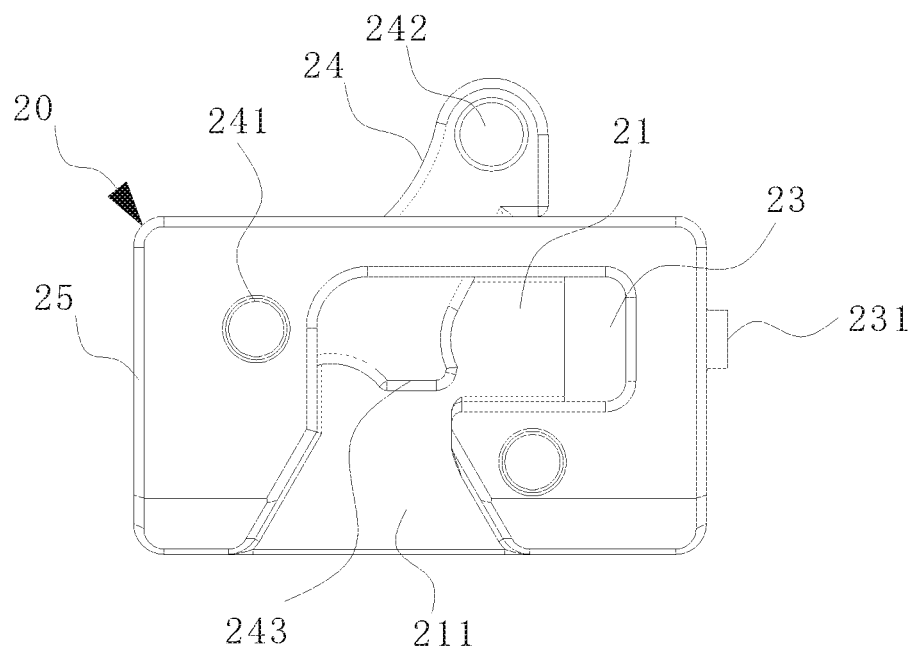
FIG. 3 illustrates a schematic view of a lock base according to an embodiment of the present disclosure.
Figure 4:
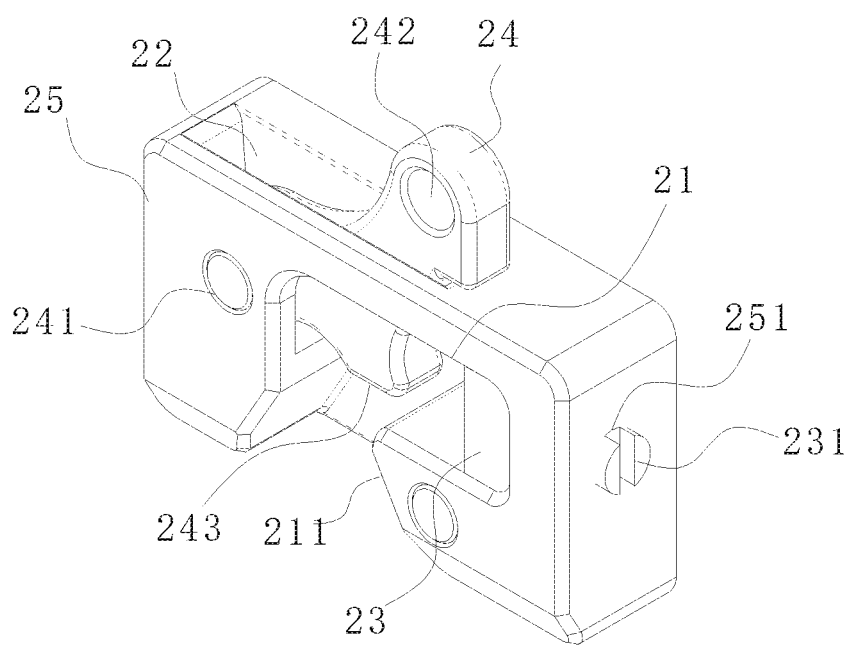
FIG. 4 is a perspective view of FIG. 3.

The locking device in the embodiment can be used to lock a power battery of an electric vehicle, in which the lock shafts 30 are mounted around a battery pack, and the lock bases 20 and the lock connecting rod 10 are mounted to an inner lateral surface of a vehicle body fixing seat for fixing the battery and arranged at positions corresponding to the positions of the lock shafts 30. As shown in FIGS. 2 and 3, in an embodiment of the present disclosure, the lock groove 21 has a certain length in the horizontal direction, and the lock groove 21 has a side provided with an opening 211 in connection with a bottom surface of the lock body 25 and leading to the outside of the lock body, in which the opening 211 is used for the lock shaft 30 mounted on the battery to enter. The lock tongue groove 22 has an opening which leads to a top surface of the lock body, and the lock tongue passes through this opening to be movably connected with the lock connecting rod 10. A side of the lock tongue adjacent to the lock groove 21 is provided with a stopping device 2A, and the stopping device 2A is configured to close the opening 211 of the lock groove 21.

The lock body 25 has a back surface fixedly fixed to the vehicle body fixing seat, and a front surface facing the battery to be installed. The lock connecting rod 10 is movably mounted above the lock base 20 through the lock tongue. The lock shaft 30 is mounted on an outer side of the battery pack by the shaft seat at a position corresponding to the lock base 20.

When in use, the battery enters the fixing seat from the bottom of the electric vehicle under a lifting action of a battery-changing mobile platform, and a unlocking member pushes the lock connecting rod 10 to move upwards and drives the lock tongue to open the opening 211 of the lock groove 21, such that the lock shaft 30 around the battery is inserted into the lock groove 21 through the opening 211 of the lock groove 21 of the corresponding lock base 20 by means of the shaft rod 31, and then is moved to the other side of the lock groove 21 under the push of the battery-changing mobile platform until the lock shaft comes into contact with the other end of the lock groove. In such a way, a suspension process of the battery is completed. During the insertion of the shaft rod 31, the lock connecting rod 10 drives the stopping device 2A to move upwardly, under the push of the unlocking member, and when the shaft rod 31 enters a locking region in the lock groove 21 beyond the position of the stopping device 2A, the stopping device 2A falls under the gravity of the lock connecting rod 10 to laterally block a return path of the shaft rod 31. At this time, the battery is in a state of being completely locked to the electric vehicle. When the battery needs to be replaced, an unlocking device on the battery-changing mobile platform contacts the lock connecting rod 10 and pushes the lock connecting rod 10 to rise, so that the lock tongue leaves the lock groove 21, and at this time, the battery is moved to cause the shaft rod 31 to be withdrawn from the lock groove 21, thereby completing a battery removal process.

Figure 5:
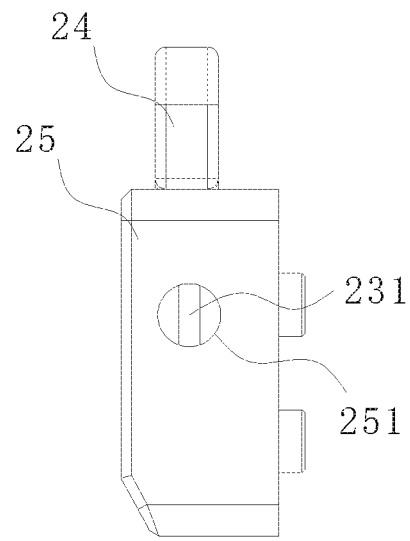
FIG. 5 is a right view of FIG. 4.
Figure 6:
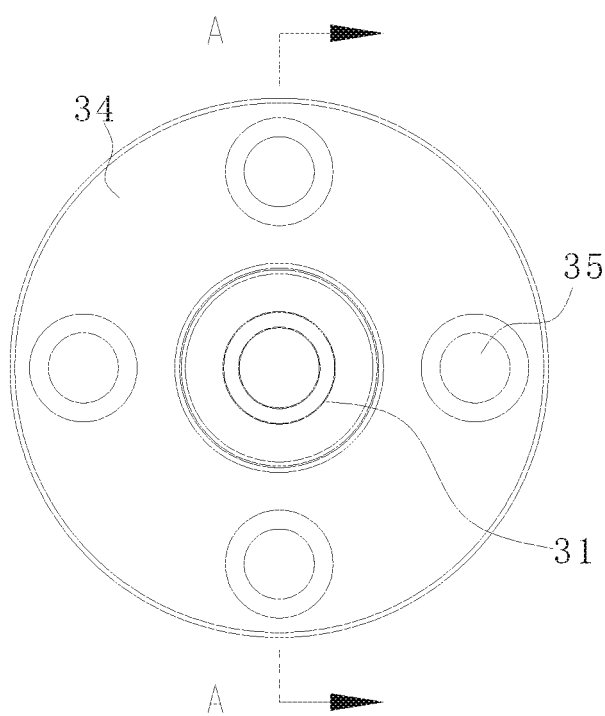
FIG. 6 illustrates a front view of a lock shaft according to an embodiment of the present disclosure.
Figure 7:
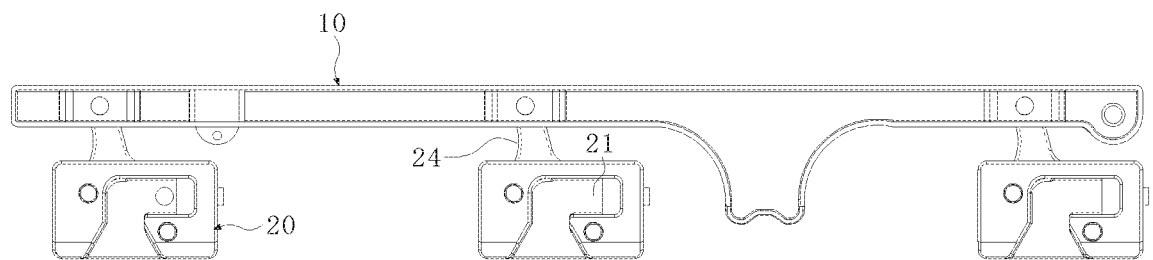
FIG. 7 illustrates a schematic view of a lock connecting rod according to an embodiment of the present disclosure.
Figure 8:
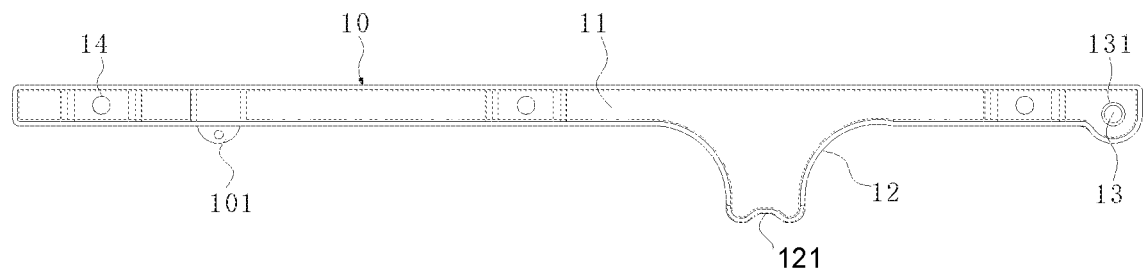
FIG. 8 illustrates a schematic view of a lock connecting rod according to an embodiment of the present disclosure.
Figure 9:
FIG. 9 is a top view of FIG. 8.
Figure 10:
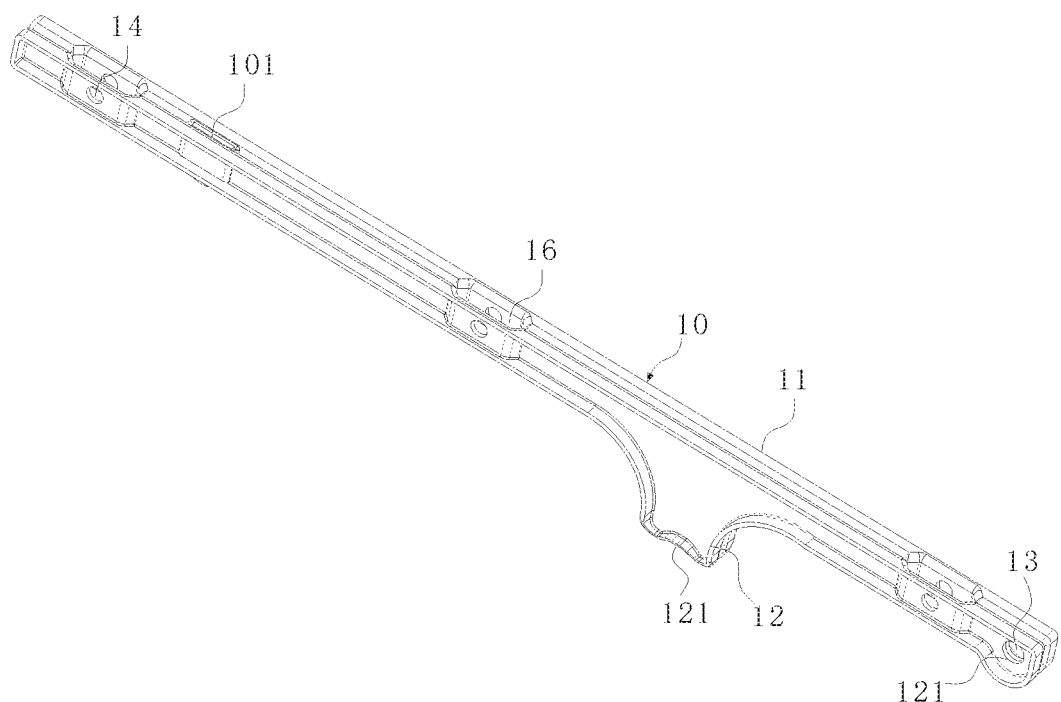
FIG. 10 is a perspective view of FIG. 9.
Figure 11:
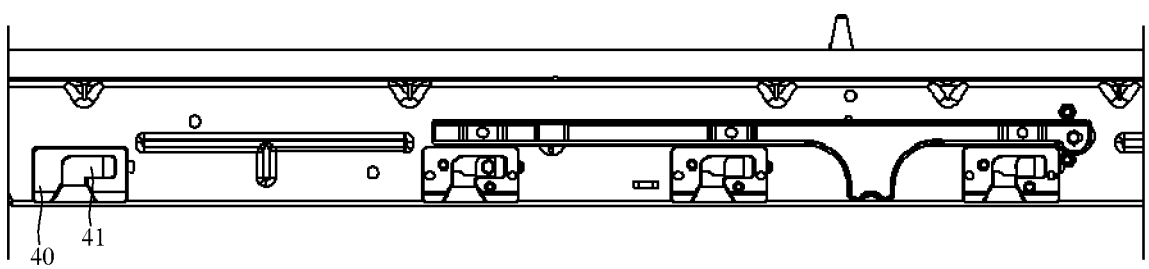
FIG. 11 illustrates a partially schematic view of a fixing seat according to an embodiment of the present disclosure.
Figure 12:
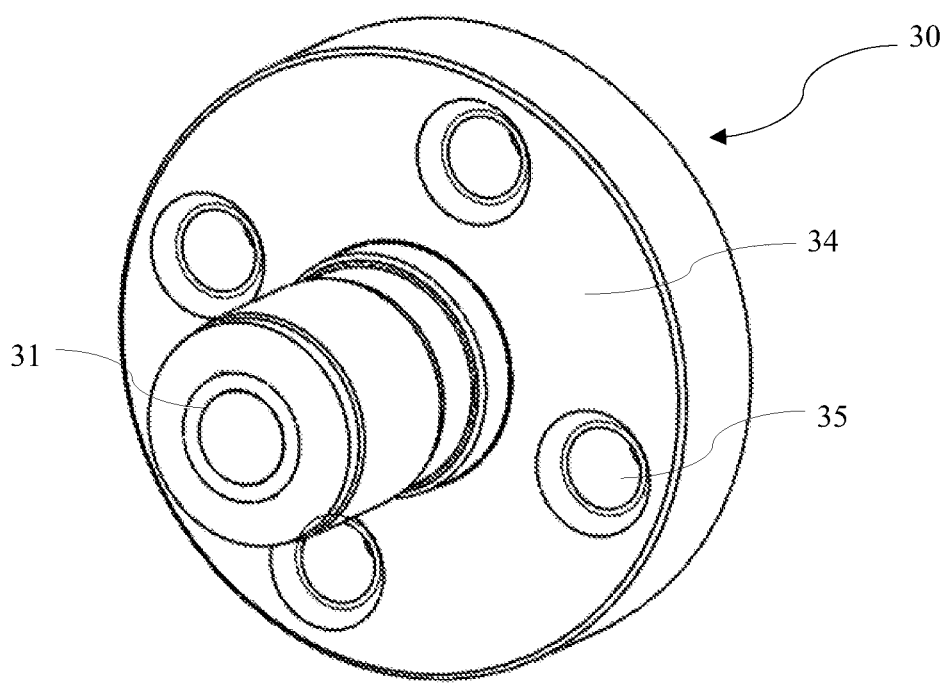
FIG. 12 illustrates a circular shaft seat according to an embodiment of the present disclosure.
Figure 13:
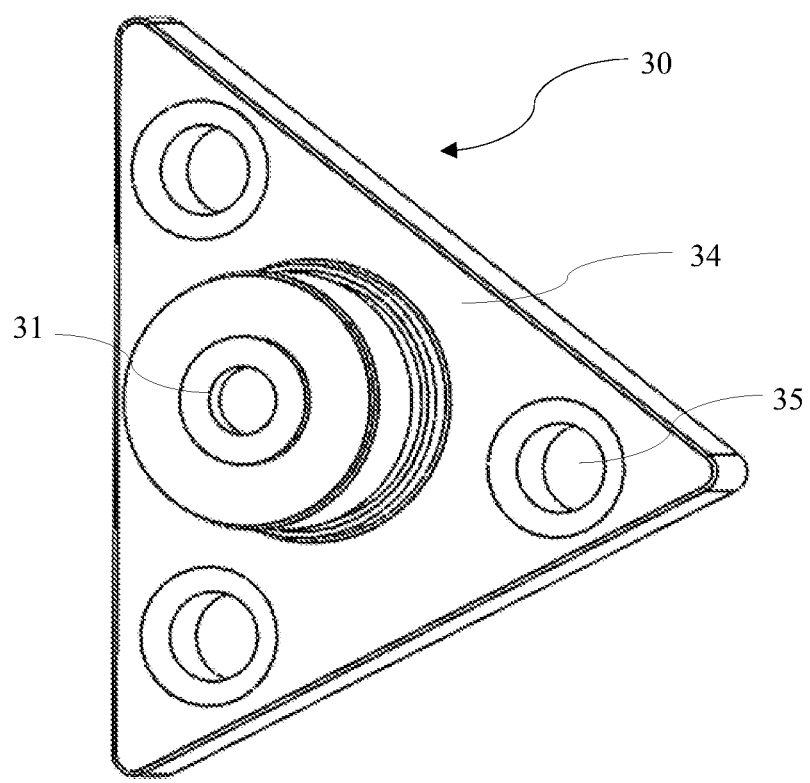
FIG. 13 illustrates a triangular shaft seat according to an embodiment of the present disclosure.
Figure 14:
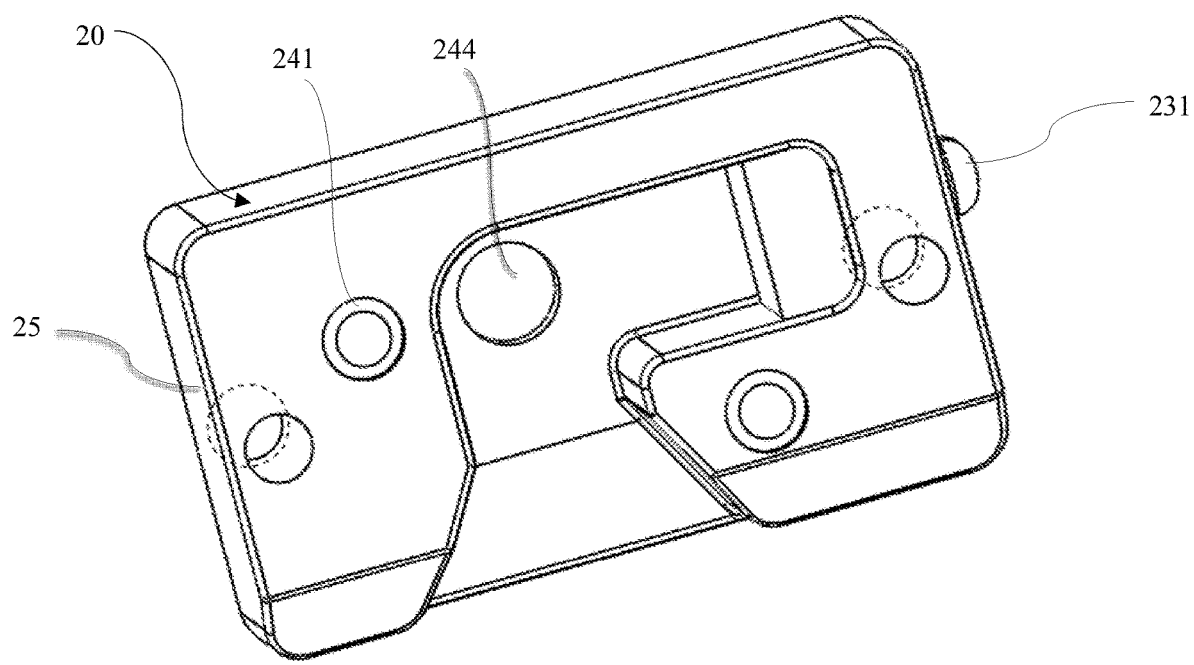
FIG. 14 illustrates a schematic view of a lock base according to an embodiment of the present disclosure.
Figure 15:
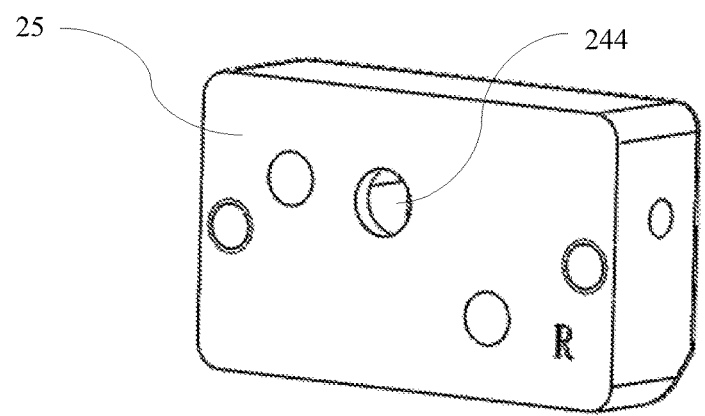
FIG. 15 illustrates a rear view of the lock base of FIG. 14.
Figure 16:
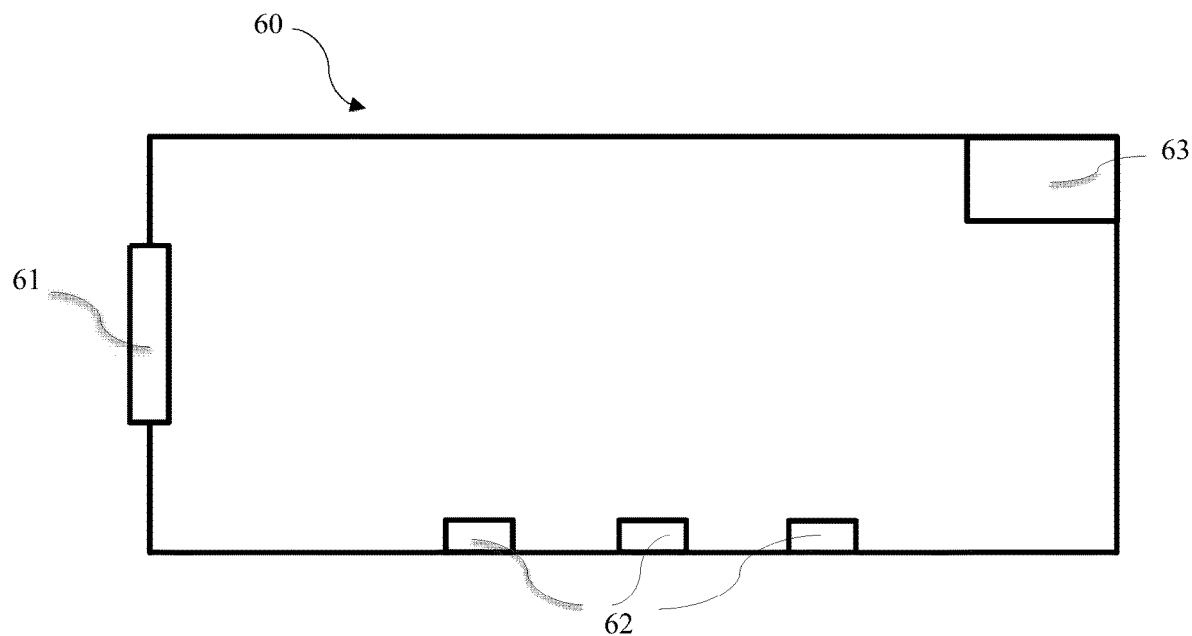
FIG. 16 illustrates a schematic view of a fixing seat according to an embodiment of the present disclosure.
Figure 17:
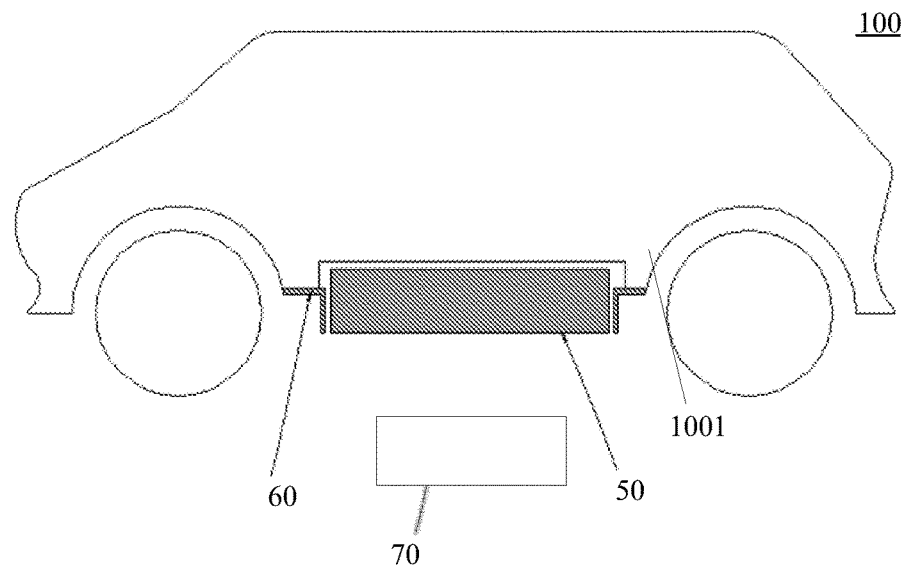
FIG. 17 illustrates a schematic view of an electric vehicle according to an embodiment of the present disclosure.

As shown in FIG. 5, in an embodiment of the present disclosure, an elastic pad 23 is mounted on the other end of the lock groove 21 away from the opening 211, and an elastic pad mounting hole 251 is provided in a side wall of the other end. The elastic pad 23 may be installed in the elastic pad mounting hole 251 through a pillar 231 on a surface of the elastic pad. By providing the elastic pad 23 at the other end of the lock groove, after the lock shaft is inserted into the lock groove 21, the friction between the lock shaft 30 and the lock groove 21 can be reduced to protect the lock shaft 30. This structure facilitates the installation and removal of the elastic pad 23. The pillar 231 may adopt a tensioning structure with an opening, and after being inserted into the elastic pad mounting hole 251, the protrusion may be automatically clamped to prevent an unintentional escape of the elastic pad 23. The elastic pad 23 may be specifically made of an organic material such as rubber or plastic, so as to have certain stiffness and meanwhile avoid causing hard damage to the lock shaft 30.

In an embodiment of the present disclosure, the lock groove 21 may adopt an L-shaped structure, which can provide the battery with a stable suspension platform, and at the same time, the elastic pad 23 is arranged at the end of the lock groove 21, which can reduce the collision between the battery and the fixing seat during the installation and during driving, thereby improving the service life of various locking components. In other embodiments, the lock groove 21 may also adopt a curved shape or other shapes capable of providing the suspension platform.

In an embodiment of the present disclosure, the stopping device 2A may be specifically configured as a stop block 243 protruding from the lock tongue 24 towards a side of the lock groove 21, and the stop block 243 is used to close the opening 211 of the lock groove 21 to prevent the shaft rod 31 inserted into the lock groove 21 from sliding out of the lock groove 21. The lock tongue 24 is connected in the lock tongue groove 22 through a shaft, and the lock tongue 24 includes a lock tongue groove shaft hole 241 connected to the lock tongue groove 22, and a lock connecting rod shaft hole 242 connected to the lock connecting rod 10 which pushes the lock tongue 24 to rotate.

The lock tongue 24 in a normal state is simultaneously connected to the lock base 20 and the lock connecting rod 10 through shafts. Since the lock connecting rod 10 is in an active state, the lock tongue 24 can be rotated about a shaft connection point with the lock base 20 by the movement of the lock connecting rod 10, so that the stop block 243 of the lock tongue 24 can be switched between a state of entering the lock groove 21 and a state of leaving the lock groove 21. The lock connecting rod 10 is pushed to move upwards by the external unlocking device, such that the lock tongue is moved upwards, and the stop block 243 leaves the lock groove 21. The shaft rod 31 of the lock shaft 30 enters the lock groove 21 from the opening 211, and is translated into the locking region of the lock groove 21 under the push of the battery-changing platform. At this time, the unlocking device is removed, the lock connecting rod 10 moves downwards by gravity, the lock tongue is also moved downwards, and the stop block 243 blocks the opening 211 of the lock groove 21, such that the shaft rod is locked in the lock groove 21, and the corresponding battery is also stably fixed in the fixing seat of the electric vehicle.

During the battery replacement, the unlocking device on the battery-changing mobile platform pushes the lock connecting rod 10 upwardly in an upward lifting process, and the movement of the lock connecting rod 10 naturally drives the stop block 243 of the lock tongue 24 to leave the lock groove 21. At this time, the battery can be moved to remove the lock shaft 30 from the opening 211 of the lock groove 21, thereby completing the unlocking of the battery.

In an embodiment of the present disclosure, a diameter of a first end of the opening 211 at the bottom surface may be larger than a diameter of a second end of the opening 211 at the lock groove 21. The use of such an open structure facilitates the entry of the lock shaft 30 and also reduces the collision damage to the lock base 20.

In an embodiment of the present disclosure, the bottom surface of the lock body 25 and the front surface of the lock body 25 may be connected through tangent surfaces. This structure can reduce the collision with the lock base 20 in a rising process of the battery.

In an embodiment of the present disclosure, the back surface of the lock body 25 is provided with a lock shaft sensing hole 244 in connection with the lock groove 21. A sensing device may be installed at a position of the fixing seat corresponding to the lock shaft sensing hole 244. When the lock shaft 30 enters the lock groove 21, a positioning steel magnet 32 mounted thereon is sensed by the sensing device when passing through the lock shaft sensing hole 244, such that it is determined whether the battery currently enters the lock groove 21 or not, thereby determining the next action.

As shown in FIG. 2, in an embodiment of the present disclosure, a concave positioning hole 321 is provided in an end 312 of the shaft rod 31 away from the shaft seat 34, and the positioning steel magnet 32 is mounted in the positioning hole 321. A sleeve 33 is fitted over the shaft rod 31 to prevent the positioning steel magnet 32 from coming off. The shaft seat 34 may have a circular plate-like structure, fixing holes 35 are provided around a center of the circle, and the shaft seat 34 is fixed to a side edge of the battery. The shaft rod 31 is perpendicularly connected to the center of the shaft seat 34, the concave positioning hole 321 is provided in the end 312 away from the shaft seat 34, and after the shaft seat 34 is fixed to the battery, the shaft rod 31 perpendicularly projects outwards. The positioning steel magnet 32 is mounted in the positioning hole 321 of the shaft rod 31, and configured to provide sensing information to an external sensing device, so as to indicate the current position of the battery. The sleeve 33 is fitted over an outer circumference of the end 312 of the shaft rod 31 to which the positioning steel magnet 32 is mounted, and the sleeve 33 and the shaft rod 31 may be in a sliding relationship.

In the present embodiment, a plurality of the lock shafts 30 may be provided, and they are fixed, through the fixing holes 35 in the shaft seat 34, to a side edge of the battery in contact with the fixing seat of the electric vehicle. The positions of the fixed lock shafts 30 correspond to the positions of the lock bases 20 on the fixing seat. Each of the shaft rods 31 protrudes perpendicularly from the side edge of the battery. When the battery is snapped into the fixing seat of the electric vehicle under the control of the battery-changing mobile platform, the shaft rods 31 of the lock shafts 30 are inserted into the lock grooves 21 of the corresponding lock bases 20, and the friction of the shaft rod 31 in the moving contact with the lock groove 21 can be reduced by the sleeve 33. When the battery-changing mobile platform drives the shaft rod 31 to move in the lock groove 21, the positioning steel magnet 32 at a front end 312 of the shaft rod 31 passes through the sensing device mounted on the fixing seat, so that the battery-changing mobile platform clearly knows the current installation position of the battery and can make the next action in time.

In the present embodiment, the friction between the lock shaft 30 and the lock base 20 can be reduced, the locking and unlocking processes can be improved, and clear movement state information of the battery can be offered to provide a basis for automatic unlocking and automatic locking.

In an embodiment of the present disclosure, in order to define the position of the sleeve 33, a retaining ring or a retaining flange may be provided at both ends of the shaft rod 31. An outwardly protruding retaining flange 36 is provided at an end 311 of the shaft rod 31 close to the shaft seat 34, and has a diameter larger than a diameter of the shaft rod 31, so that the sleeve 33 can be restricted at a specified position of the shaft rod 31 to achieve better contact with the lock groove 21. The retaining flange 36 may also prevent the shaft seat 34 from rubbing against the lock base 20 and hence avoid causing damage to the corresponding components. Further, a retaining ring 331 may be provided at an end 312 of the shaft rod 31 away from the shaft seat 34 and be configured to prevent the sleeve 33 from coming off. The retaining ring 331 may be mounted to the shaft rod 31 by a structure that is snapped in a groove of the shaft rod 31.

In order to facilitate the fixation of the lock shaft 30, in an embodiment of the present disclosure, the shaft seat 34 of the lock shaft 30 may be circular or triangular, and three to four fixing holes 35 are provided and symmetrically distributed around the center of the shaft seat 34.

In an embodiment of the present disclosure, a connecting end 311 of the shaft rod 31 with the shaft seat 34 may pass through a shaft hole in the center of the circle and may be exposed from the other end. A snap ring may be provided to the passing end 312 of the shaft rod 31 to prevent the shaft rod 31 from coming off. The snap ring may be mounted in the same way as the aforementioned retaining ring 331. Although the shaft rod 31 and the shaft seat 34 are movably mounted, the shaft rod 31 may be integrally formed with the shaft seat 34 in other embodiments.

As shown in FIGS. 7-10, in an embodiment of the present disclosure, the lock connecting rod 10 may specifically include an elongated rod-like member 11, and the lock connecting rod 10 may be movably connected with a plurality of lock bases 20 to be locked through the lock tongues. The lock connecting rod has a length corresponding to the distance among the plurality of lock bases 20 to be locked, and a through hole 16 is provided at a position corresponding to each of the lock bases 20 and configured to be connected with the lock tongue 24 through a shaft. The through hole 16 facilitates the insertion of the lock tongue, and the number of the through holes 16 corresponds to the number of the lock bases. The rod member 11 is further provided with an unlocking block 12 on a side corresponding to the position of the lock base 20, and the unlocking block 12 is used to lift the rod member 11 under the push of the unlocking device of the battery-changing mobile platform, so that the lock connecting rod 10 drives the lock tongue 24 to switch between an unlocking state and a locking state.

When installed, the lock connecting rod 10 is connected with the lock tongue 24 through shaft and hence is located above each lock base 20, and the lock tongue 24 is also connected with the lock base 20 by a shaft, so that the rise and fall of the lock connecting rod 10 can drive the lock tongue 24 to rotate around a shaft connection point in the lock base 20, to realize the switch between the state of being snapped into the lock groove 21 and the state of leaving the lock groove 21. This embodiment employs a single lock connecting rod 10 to simultaneously control the lock tongues 24 of the plurality of lock bases 20, thereby realizing a function of synchronously unlocking and locking the plurality of lock bases 20, so as to improve the unlocking process of the battery and accelerate the battery replacement efficiency.

The rod member 11 of each lock connecting rod 10 may be provided with three through holes 16, and a fixing hole 14 may be provided in the through hole 16 and configured to be connected with the lock tongue by means of a shaft. Each fixing hole 14 corresponds to and is connected with the lock tongue 24 of one lock base 20. The fixing hole 14 runs through the through hole 16 in a manner perpendicular to a lateral surface of the rod member 11.

In an embodiment of the present disclosure, the unlocking block 12 may be an arc protrusion formed outwardly by the rod member 11. The top of the unlocking block 12 is configured as an inner arc groove 121 recessed towards the rod member 11. The use of the arc protrusion prevents the lock connecting rod 10 from being blocked by other components during its movement. At this time, the arc protrusion facilitates contact with the unlocking device of the battery-changing mobile platform, to enable the unlocking device to move the lock connecting rod 10 along the arc protrusion in a transverse direction instead of being stuck in a certain position. The structure of the inner arc groove 121 on the top of the unlocking block 12 can form an optimal unlocking position with the unlocking device, and at this position, the lock connecting rod 10 has been fully unlocked and the retention of the unlocking device is facilitated. The position of the unlocking block 12 may be specifically arranged on the rod member 11 between the two through holes, as long as the movement of the lock connecting rod 10 is not affected.

In an embodiment of the present disclosure, a spring pull tab 101 on the same side of the unlocking block 12 may be fixedly mounted on the rod member 11, and an exposed end of the spring pull tab 101 is provided with a hooking hole. The spring pull tab 101 is used to connect a spring fixed to the fixing seat of the electric vehicle, and the spring applies a pulling force to the lock connecting rod 10 towards the lock base 20 to improve the stability of the lock connecting rod 10 in the locked state.

In an embodiment of the present disclosure, in order to determine the current position of the lock connecting rod 10, a positioning steel magnet 13 may be mounted on the rod member 11, and the positioning steel magnet 13 may generate induction with an external magnetic detecting device to determine the current position of the rod member 11 according to a sensing signal.

The positioning steel magnet 13 may be specifically mounted at an end of the rod member 11 and may be cylindrical; the end of the rod member 11 is provided with a steel magnet mounting hole 131 passing through the rod member 11; and the positioning steel magnet 13 is inserted in the steel magnet positioning hole 131. A corresponding sensing device is provided on a moving track of the positioning steel magnet 13. When the rod member 11 is moved, the positioning steel magnet 13 stays at or passes through the sensing device to determine whether the lock connecting rod 10 is currently in the unlocked state or in the locked state.

As shown in FIGS. 11 and 16-19, in an embodiment of the present disclosure, a fixing seat 60 for a battery 50 of an electric vehicle 100 is provided and is adapted to be mounted to a vehicle body 1001 of the electric vehicle 100 to fix the battery 50. The fixing seat 60 includes an electrical connector 61 and a locking device. The electrical connector 61 and the locking device are arranged on a side of the fixing seat 60 opposite to the battery 50, the electrical connector 61 is used for electrical connection between the battery 50 and the vehicle body 1001, and the locking device is used to lock the battery 50 to the vehicle body 1001.

In an embodiment of the present disclosure, the fixing seat 60 further includes a sensing device 62 and a signal transmission unit 63, the sensing device 62 is used to detect the position of the battery 50 relative to the locking device, and the signal transmission unit 63 communicates with the sensing device 62 and is used to communicate with an external battery moving device 70. The fixing seat 60 may include a plurality of sensing devices 62 configured to correspondingly determine whether the lock shafts enter the lock grooves and determine whether the lock connecting rod is in the unlocked state or the locked state. The sensing device 62 may be installed at a position of the fixing seat 60 corresponding to the lock shaft sensing hole 244. When the lock shaft 30 enters the lock groove 21, the positioning steel magnet 32 mounted thereon is sensed by the sensing device 62 when passing through the lock shaft sensing hole 244, thereby determining whether the battery 50 currently enters the lock groove 21, so as to determine the next action. Herein, the sensing device 62 installed at the position of the fixing seat 60 corresponding to the lock shaft sensing hole 244 is a sensing device configured to determine whether the lock shaft enters the lock groove. A corresponding sensing device is provided on a moving track of the positioning steel magnet 13. When the rod member 11 is moved, the positioning steel magnet 13 stays at or passes through the sensing device to determine whether the lock connecting rod 10 is currently in the unlocked state or in the locked state. The sensing device herein is a sensing device configured to determine whether the lock connecting rod is in the unlocked state or in the locked state.

In an embodiment of the present disclosure, the fixing seat further includes a plurality of support devices 40, and the support devices 40 are arranged on a side of the fixing seat facing the battery and configured to support the battery. In this embodiment, the support devices 40 may use a lock base that does not include a lock tongue. In other embodiments, other similar support mechanisms with support platforms are applicable. The number of the support devices 40 can be adjusted according to the weight of the actual battery, and preferably the average weight on each support device does not exceed 25 kg.

In an embodiment of the present disclosure, the support device 40 is provided with a support groove 41, and a lower surface of the support groove 41 is substantially in the same plane as a lower surface of the lock groove 21. The lower surface of the support groove 41 and the lower surface of the lock groove 21 each refer to a surface close to the ground when in use, and act as a support surface of the shaft rod 31. The fact that two lower surfaces are located in the same plane can make the battery move smoothly.

It would be appreciated by those skilled in the art that various exemplary embodiments of the present disclosure have been shown and described in detail, but many other variations or modifications consistent with the principles of the present disclosure may be directly determined or derived based on the present disclosure without departing from the scope of the present disclosure. Therefore, the scope of the present disclosure should be understood and construed to cover all such other variations or modifications.

What is claimed is:

1. A locking device, comprising:
   a lock base providing a locking position, and comprising a lock body having a surface provided with a lock groove recessed towards the inside of the lock body, the lock body being provided with a lock tongue groove and a lock tongue movably mounted in the lock tongue groove, and the lock tongue groove being in connection with the lock groove;
   a lock connecting rod movably connected with the lock base through the lock tongue, and comprising a rod member driving the lock tongue to move; and
   a lock shaft comprising a shaft seat and a shaft rod, the shaft rod being perpendicularly arranged to a surface of the shaft seat, and the shaft rod being inserted into the lock groove of the lock base to perform locking,
   wherein an end of the shaft rod away from the shaft seat is provided with a concave positioning hole, and a positioning component is mounted in the positioning hole.

2. The locking device according to claim 1, wherein the lock groove extends along the surface of the lock body, and has a first end provided with an opening leading to the outside of the lock body, and a second end away from the opening and provided with an elastic pad and an elastic pad mounting hole; the elastic pad mounting hole is arranged in a side wall of the second end of the lock groove, and the elastic pad is inserted into the elastic pad mounting hole through a pillar protruding from a surface of the elastic pad.

3. The locking device according to claim 1, wherein the rod member is provided with a through hole connected with the lock tongue, the shaft seat is provided with a plurality of fixing holes in a surface of the shaft seat, and the shaft seat is mounted to a surface of a battery to be locked through the fixing holes.

4. The locking device according to claim 1, wherein the rod member is provided with an unlocking block on a side facing the lock base, the unlocking block is an arc protrusion formed outwardly by the rod member, and the unlocking block has a top formed as an inner arc groove recessed towards the rod member.

5. The locking device according to claim 4, wherein a spring pull tab is fixed on a side of the rod member facing the unlocking block, and an exposed end of the spring pull tab is provided with a hooking hole.

6. The locking device according to claim 2, wherein the lock tongue is connected with the lock base and the lock connecting rod through a shaft, separately, the lock tongue is provided with a stop block on a side adjacent to the lock groove, the stop block closes the opening, and the lock connecting rod drives the lock tongue to close or open the opening.

7. The locking device according to claim 1, wherein another end of the shaft rod is movably connected with or integrated with the shaft seat.

8. The locking device according to claim 1, wherein a sleeve is fitted over an outer surface of the shaft rod and slidably connected with the shaft rod, the shaft rod has two ends provided with a retaining ring or a retaining flange separately, and the retaining ring or the retaining flange limits a position of the sleeve.

9. The locking device according to claim 1, wherein the lock body is provided with a lock shaft sensing hole in connection with the lock groove.

10. The locking device according to claim 1, wherein the rod member is provided with a positioning steel magnet, and the positioning steel magnet generates induction with an external magnetic force detecting device to indicate a current position of the rod member.

11. A fixing seat for a battery of an electric vehicle, the fixing seat being mounted to a vehicle body of the electric vehicle to fix the battery, and comprising an electrical connector and the locking device according to claim 1, wherein the electrical connector and the locking device are arranged on a side of the fixing seat opposite to the battery, the electrical connector is used for electrical connection between the battery and the vehicle body, and the locking device is used to lock the battery to the vehicle body.

12. The fixing seat according to claim 11, further comprising a sensing device and a signal transmission unit, wherein the sensing device detects a position of the battery relative to the locking device, and the signal transmission unit communicates with the sensing device and an external battery moving device.

13. The fixing seat according to claim 11, further comprising a plurality of support devices, wherein the support devices are arranged on a side of the fixing seat facing the battery and support the battery.

14. The fixing seat according to claim 13, wherein each of the support devices is provided with a support groove, and a lower surface of the support groove is in the same plane as a lower surface of the lock groove.

15. An electric vehicle, comprising a power battery and a fixing seat for installation of the power battery, the fixing seat being mounted to a vehicle body, wherein the electric vehicle further comprises the locking device according to claim 1, the lock shaft of the locking device is mounted to an outer lateral surface of the power battery through a fixing hole of the shaft seat, the lock base and the lock connecting rod of the locking device are mounted to an inner lateral surface of the fixing seat opposite to the power battery, the lock groove in a surface of the lock base is arranged corresponding to the lock shaft on the outer lateral surface of the power battery, and the lock connecting rod is located above the lock base.

16. The electric vehicle according to claim 15, wherein the inner lateral surface of the fixing seat is located below the lock connecting rod and is further provided with an elastic component, and the elastic component has a first end fixedly connected with the fixing seat and a second end connected to a hooking hole in a side of the lock connecting rod.

17. The locking device according to claim 8, wherein the retaining flange that protrudes outwardly is provided at an end of the shaft rod close to the shaft seat and has a diameter larger than a diameter of the shaft rod, and the retaining ring is provided at an end of the shaft rod away from the shaft seat and prevents the sleeve from coming off.

18. The locking device according to claim 2, wherein the pillar is a tensioning structure with an opening, and can be clamped automatically after being inserted into the elastic pad mounting hole.

19. The locking device according to claim 3, wherein the shaft seat is circular or triangular, and three to four fixing holes are provided and symmetrically distributed around the center of the shaft seat.

* * * * *